United States Patent [19]
Nasikas

[11] Patent Number: 5,306,330
[45] Date of Patent: Apr. 26, 1994

[54] METHOD AND MECHANISM FOR THE SUPERSONIC SEPARATION OF DROPLETS FROM A GAS STREAM

[76] Inventor: Athanasios Nasikas, Ethnikis Antistaseos 10,, 413 35 Larissa, Greece

[21] Appl. No.: 742,331

[22] Filed: Aug. 8, 1991

[30] Foreign Application Priority Data

Aug. 10, 1990 [GR] Greece ............................ 900100605

[51] Int. Cl.$^5$ ............................................ B01D 51/08
[52] U.S. Cl. .......................................... 95/29; 95/267; 55/277; 55/394
[58] Field of Search .............................. 55/15, 17, 277

[56] References Cited

U.S. PATENT DOCUMENTS 3,528,216  9/1970  Garrett ...................................... 55/15
4,863,491  9/1989  Brandt et al. .......................... 55/277

FOREIGN PATENT DOCUMENTS 721708  3/1980  U.S.S.R. ................................. 55/15

*Primary Examiner*—Charles Hart

[57] ABSTRACT

In the present invention separation is effected by means of a convergent-divergent nozzle, in which the divergent portion is convex. A supersonic flow of a gas-droplets mixture is introduced into the convergent-divergent nozzle and at the throat thereof a normal shock wave occurs and results to an abrupt change in the speed and direction of gas flow, which becomes subsonic and follows the geometry of the convex divergent portion. The droplets are inertially separated from the gas stream and two flow zones emerge, one zone free from droplets and one enriched with droplets, these two zones being subsequently separated by a separator plate. Henceforth, a conventional subsonic separator is used to receive the liquid formed by the separated droplets, whereas the zones of gas flow being free from droplets converge to be subsequently used in any desired manner.

5 Claims, 3 Drawing Sheets

METHOD AND MECHANISM FOR THE SUPERSONIC SEPARATION OF DROPLETS FROM A GAS STREAM

THE FIELD OF THE INVENTION

The present invention is applicable as a separator for a gaseous mixture, which comprises many components, some of which may be separated when entering into a convergent-divergent nozzle where they are liquified under supersonic conditions and by means of the merchanism of the present invention they are separated from the remaining gaseous components. In this way it is possible to separate the various components in natural gas, or the coal tar present, under steam condition, within the flue gases discharged from the coal burning power stations, or to convert a saturated mixture e.g. of air and water vapour into an unsaturated one, for drying purposes.

THE PRIOR ART

A great number of inventions is associated with the art of the general separation of a gas stream from liquid or solid particles. Herein below are listed patents, already issued pertinent to this field of the art:

1. U.S. Pat. No. 2,474,695 of Schneidel et al (1949)
2. U.S. Pat. No. 3,509,932 of Chambers (1970)
3. U.S. Pat. No. 3,528,216 of Garrett (1970)
4. U.S. Pat. No. 3,528,217 of Garrett (1970)
5. U.S. Pat. No. 3,559,373 of Garrett (1971)
6. U.S. Pat. No. 3,894,851 of Gorman (1975)
7. U.S. Pat. No. 4,378,976 of Rush (1983)
8. U.S. Pat. No. 4,448,135 of Dougan et al (1984)
9. Japanese patent Kawasaki Heavy Ind KK (1978) J55079022
10. U.S.S.R. patent No. 1,228,881 (1985)
11. U.S. Pat. No. 4,111,671 of Williamson (1978)
12. U.S. Pat. No. 4,292,050 of Linhardt et al (1981)

From the above cited patents it is only the U.S. patents of Garrett U.S. Pat. Nos. 3,528,216, 3,528,217, 3,528,221, 3,559,373 and the U.S. Pat. No. 4,292,050 of Linhard et al, which refer to a supersonic separator. Given that the principle of operation of the present invention is based upon provision of supersonic conditions, it is obvious that the remaining of the above cited patents are in no way comparable with the present invention.

Further, in relation to Garrett's abovementioned patents, it is noted that the principle of operation is entirely different. Garrett's patents are based upon the centrifugal separation of droplets and to their discharge via a permeable wall. In the contrary, the present invention is based upon separation by means of a normal shock wave, downstream of which the droplets because of their inertia have a speed relatively higher than the remaining flow. Upstream the normal shock wave, the gas and droplets flow at approximately the same speed. In the contrary, immediately downstream the shock wave, the speed of the gas flow is abruptly reduced, whereas the droplets maintain the speed they had upstream the shock wave. This, initially intense, speed difference, is the main cause of facilitating centrifugation of droplets in the downstream convex divergent portion of the nozzle and their eventual separation by means of a separator plate.

In the above cited patent of Linhard et al, separation is effected by means of an oblique shock wave and not a normal shock wave, as is the case in the present patent application. The droplets in Linhard's patent are separated by means of a change in the direction of flow of the gas stream at the region of the oblique shock wave in relation to the flow of the droplets and by means of a subsequent centrifugal separation by means of a curved portion under supersonic conditions, whereas in the proposed invention separation is effected by means of changing the speed of the droplets in relation to the remaining flow, through a normal shock wave and by means of subsequent centrifugation under subsonic conditions within a convex divergent nozzle with a separator plate.

A table is provided below, wherein the proposed supersonic separator is compared to the cited prior art patents of Garrett and Linhard with reference to some of the most important differentiating characteristics of devices in this field of the art.

TABLE 1

| CHARACTERISTICS OF SUPERSONIC SEPARATORS | | | |
|---|---|---|---|
| CHARACTERISTIC | PRESENT INVENTION | GARRETT'S PATENTS | LINHARD ET AL U.S. Pat. No. 4,292,050 |
| 1. Separation upstream the wave | | + | |
| 2. Separation downstream the wave | + | | + |
| 3. Separation with a normal shock wave | + | | |
| 4. Separation with a weak oblique shock wave | | | + |
| 5. Separation into a curved portion under supersonic conditions downstream the shock | | | + |
| 6. Separation into a divergent nozzel with separator plate downstream the shock under subsonic conditions | + | | |
| 7. Separation upstream the shock by means of a permeable wall and centrifugal curve | | + | |
| 8. Fog formation of the element to be separated | | In all patents, it is effected within a Laval nozzel in accordance to the technique known since 1930, which is described in the book entitled: "Two phase steam flow in turbines and separators" (ed. | |

TABLE 1-continued
CHARACTERISTICS OF SUPERSONIC SEPARATORS

| CHARACTERISTIC | PRESENT INVENTION | GARRETT'S PATENTS | LINHARD ET AL U.S. Pat. No. 4,292,050 |
|---|---|---|---|
| | | | M. J. Moore and C. H. Sieverding p.p. 127-131 |
| 9. Separation of droplets of a very small diameter due to the action of intense separation forces. | + | | + |
| 10. Employment of other auxilliary separation elements (electric field) | | + | |
| 11. Capacity of operating at a broad range of Mach numbers, important with the broadness in the field of applications. | + | + | Unable to work in all Mach numbers, because of the phenomena of separation of flow downstream the wave and formation of intense whirlings, (Shapiro A. H.-1953. The dynamics and thermodynamics of compressible fluid flow. Vol 1, p.p. 557-558) |
| 12. Change from supersonic to subsonic flow, after separation | | + | + |

From the above table, it is evident that the present invention is substantially different from the cited patents of the prior art, both with regard to its principles of operation, as well as with regard to its merits, particularly relating to the broad variety of applications.

BRIEF DESCRIPTION OF THE DRAWINGS

In accordance to internationally accepted standards of aerodynamics, the terms used herein are defined as follows:

"Supersonic effuser" means a flow channel having a convergent subsonic portion upstream of a divergent supersonic portion, whereas in between them there is provided a sonic throat. The supersonic effuser functions as an aerodynamic expander.

"Supersonic diffuser" means a flow channel having a convergent subsonic portion, where a shock wave develops close to the throat thereof. The supersonic diffuser functions as an aerodynamic compressor.

"Shock Wave" means a discontinuity in the flow which changes from supersonic to subsonic.

"Throat" means the border between convergence and divergence in an effuser or diffuser.

Figure 1:
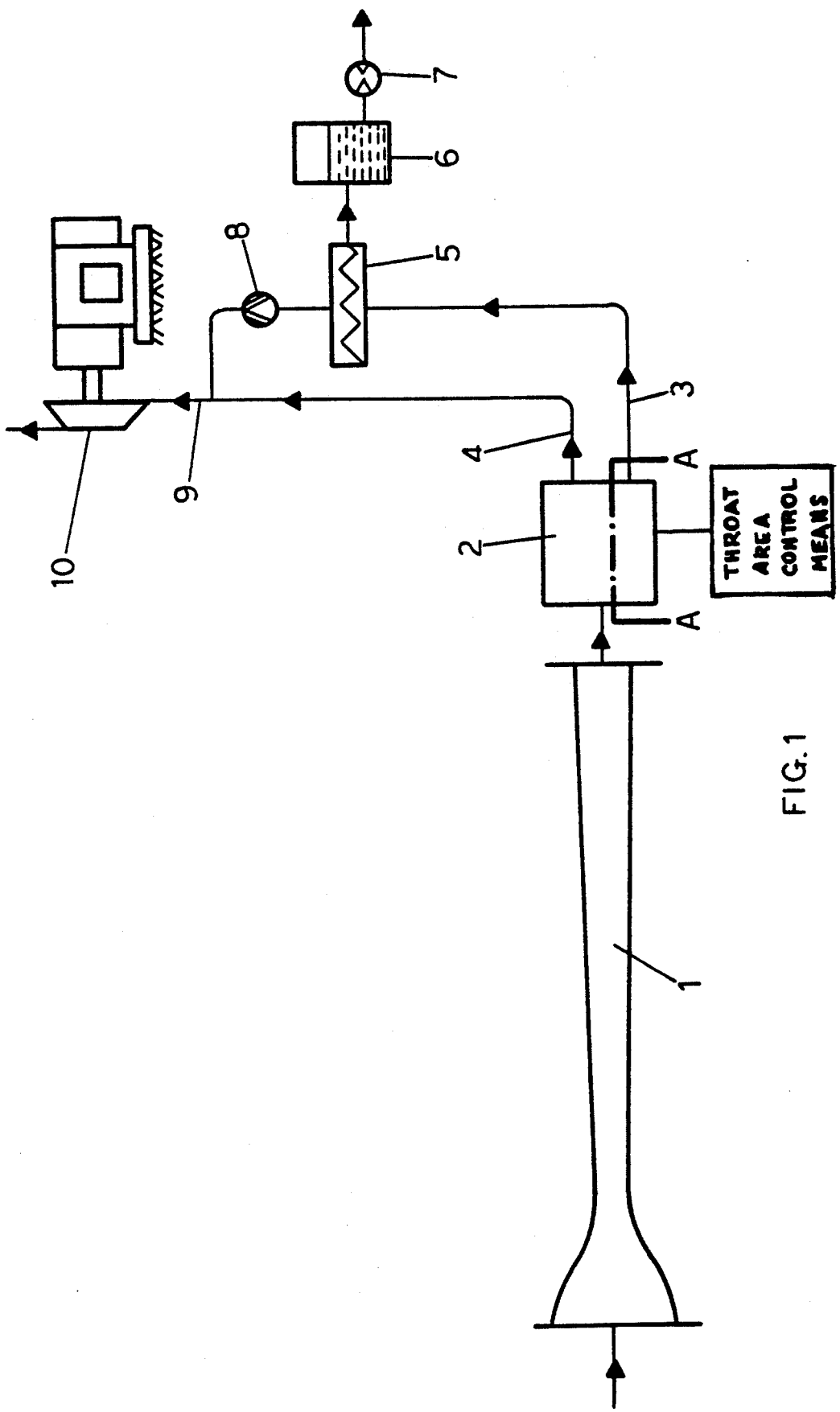

The object and merits of the present invention will become apparent by reference to the following drawings:

FIG. 1, which shows a general separator arrangement.

Figure 2:
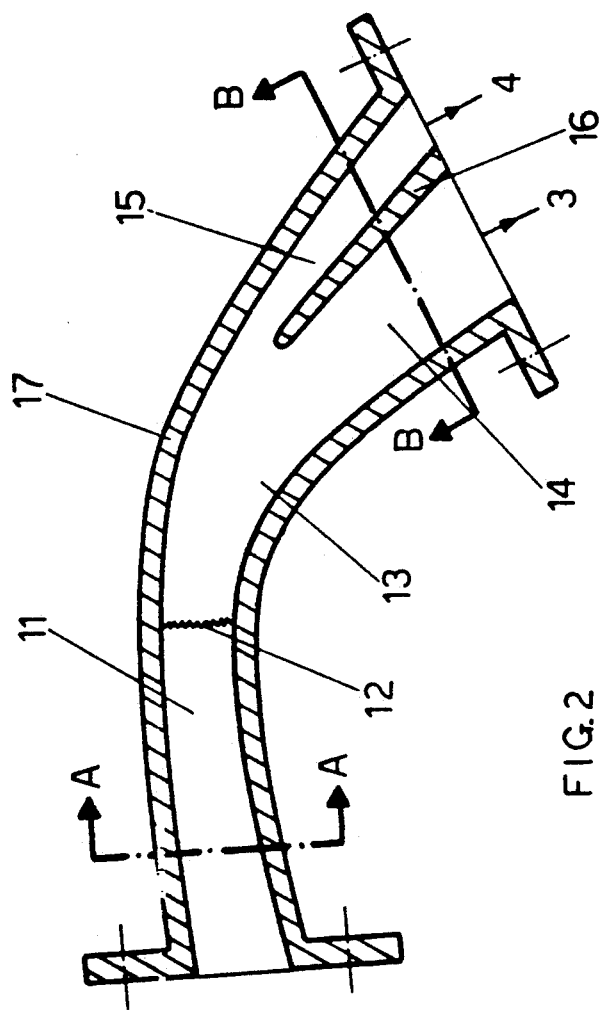

FIG. 2 shows a view taken along lines A—A of FIG. 1 and substantially illustrates the present invention.

Figure 3:
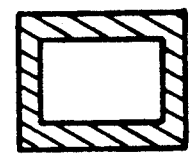

FIG. 3 shows a view taken along lines A1—A1 of FIG. 2.

Figure 4:
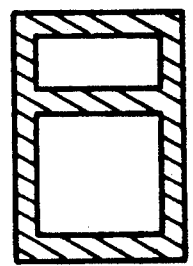

FIG. 4 shows a view taken along lines B1—B1 of FIG. 2.

Figure 5:
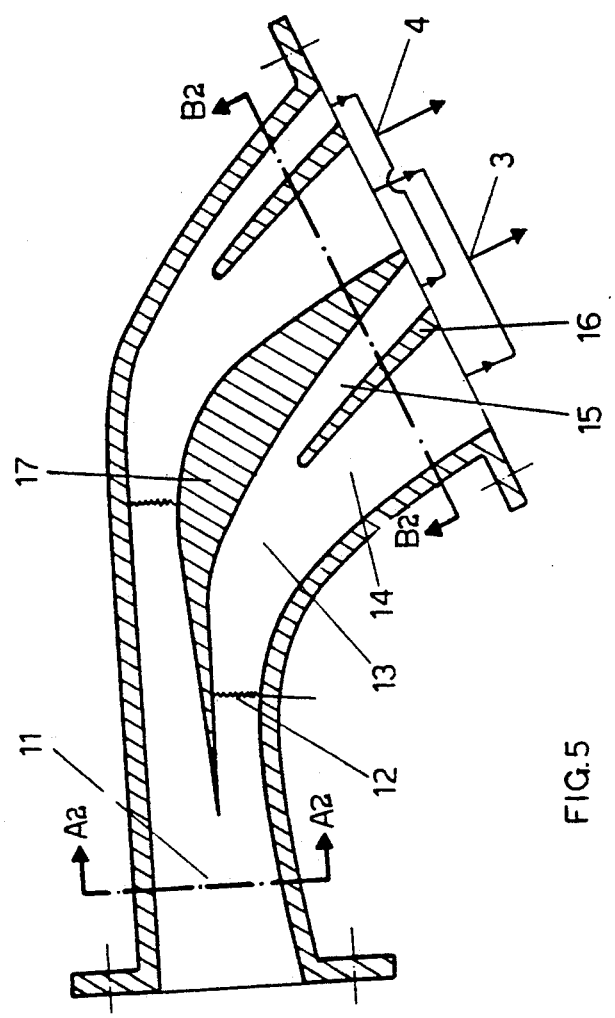

FIG. 5 shows a view of a supersonic separator wherein parallel nozzles are formed by means of intermediate blading.

Figure 6:
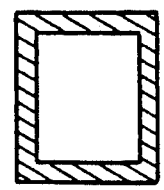

FIG. 6 shows a view taken along lines A2—A2 of FIG. 5.

Figure 7:
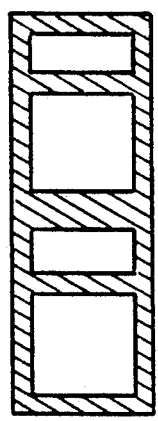

FIG. 7 shows a view taken along lines B2—B2 of FIG. 5.

The present invention relates to a method and mechanism as presented by box 2 of FIG. 1 and shown in detail in FIGS. 2, 3 and 4. FIG. 1, illustrating a general arrangement for a separator, is merely provided in order to facilitate understanding of the mechanism. This however does not confine usage of this mechanism, which can be used in various other arrangements with a problem of separating a gas stream from condensed droplets.

The supersonic effuser 1 is connected to the supersonic separator 2, which is used in separating a gas stream from condensed droplets and this is subsequently connected to the subsonic separator 5 via duct 3 and to the fan outlet 8 via duct 4. Finally, duct 9 upstream the convegence of duct 4 and the fan outlet 8 is connected to the compressor 10. Separator 5 is also connected to the liquid tank 6, which is subsequently connected to a pump 7. Separator 5 is also connected to the fan 8. The herein abovementioned elements depicted by numerals 1,3,4,5,6,7,8,9, and 10 are well known in the prior art and in no way constitute part of the claimed matter for the present invention.

FIG. 2 shows a cross sectional view of a first preferred embodiment of the present invention. The convergent portion 11 of the diffuser of the supersonic separator 2 is connected to the effuser 1. Both the supersonic separator 2 and the effuser 1 are of a rectangular section of a uniform width. Sectional change is, as depicted in FIG. 2, made only along the other side of the rectangular section. Downstream throat 12, supersonic separator 2 comprises a convex divergent nozzle 13, which is further downstream divided in two partial divergent nozzles 14 and 15 by means of the separator plate 16.

The abovementioned elements employed in the arrangement of the present invention are well known in the prior art. Adequate information on these elements can be found in the following publications:

With regard to elements 11, 12, 13:

Shapiro A. H. (1953)
"The dynamics and thermodynamics of compressible fluid flow", Vol. 1, II-John Wiley and Sons N.Y.

1. H. Shames 1962 "Mechanics of fluids" Mc Graw Hill pp. 450-483.

J. H. Nelson and A. Gilchrist 1969. "An analytical and experimental investigation of the trajectories of particles entrained by the gas flow in Nozzles"—J. Fluid Mech. Vol. 35, pp 549-559.

M. J. Zucrow—J. D. Hoffman "Gas Dynamics" Vol. I.—John Wiley & Sons N.Y. p.p. 394-403.

M. E. O'Neill—F. Chorlton "Viscous and Compressible fluid Dynamics"—John Wiley & Sons N.Y. p.p. 364–375, 388–389.

J. C. Dutton—A. L. Addy "Transonic Flow in the Throat Region of Annular Supersonic Nozzles'-'—AIAA Journal vol. 20, No. 9, pp. 1236–1243.

With regard to the positioning of plate 16 and the calculation of the streamlines followed by the droplets being separated, adequate information may be obtained from the following publication:

Friedlander S. (1977) "Smoke dust and Hase"—John Wiley and Sons N.Y. pp. 88–121.

G. Rundinger "Flow of Solid particles in Gases'-'—CASARDOgraph 222—NATO.

FIG. 5 shows another preferred embodiment of the invention wherein parallel nozzles are created by the dividing blading 17. In this case also, the references provided are adequate for the determination of the various elements.

DETAILED DESCRIPTION OF PREFERRED EMBODIMENTS

By reference to the accompanying drawings, we will herein below described an illustrative, preferred embodiment of the invention.

As mentioned in the above, the present invention proposes a method and a mechanism for the supersonic separation of a gas stream from droplets, this method comprising formation of a powerful normal shock wave, the change of direction in the flow downstream the normal shock wave and the inertial separation of the droplets.

A flow of gas-droplets mixture enters through the inlet 11 of the generally rectangular, as illustratively shown in FIG. 2, convergent—divergent nozzle of the supersonic separator of the invention. The flow subsequently converges within space 11 up to the throat 12. A normal shock wave is created at the region of throat 12, i.e. the conditions of flow are regulated so as to cause the creation of a normal shock wave in this region. The creation of the normal shock wave in this region is verified by the following occurences:

The flow abruptly changes from supersonic to subsonic.

There is an abrupt change in pressure, i.e. a pressure recovery takes place which is not accompanied by a significant rise in entropy when the Mach number downstream the wave is of the order of 1.2–1.5.

The droplets downstream the wave have a relatively high speed as compared to the speed in the remaining flow.

The flow changes direction downstream the normal shock wave through the curved divergent nozzle, whereas the droplets do not, because of inertia, follow this change, but continue flowing along the streamlines where they previously moved. Two zones are thereby created downstream the normal shock wave. A first zone comprising a dry medium and a second zone comprising a medium enriched with droplets. The second zone is eventually separated from the first by means of the separator plate 16. Thus, recovery of the two separated flows takes place within the divergent nozzles of the dry medium 14 and the droplet enriched medium 15, the two separated flows subsequently reaching the outlet ducts 3 and 4 of the proposed separator. An increase in the flow pressure and temperature starts within space 11, this increase becoming abrupt at the region where the normal shock wave occurs. Thus, in the course of the flow from the inlet region 11 to the separator plate 16, the droplets undergo re-evaporation, this phenomenon indicating that this course must be as short as possible so as to minimize occurence of these phenomena.

A wider throat 12 would result to a larger course of the droplets from the inlet region 1 to the separator plate 16 because of geometrical analogy. Thus, in order to manufacture separators suitable for large flow rates, the abovementioned length of course, as well as the dimensions of throat 12 are kept at low levels by means of a suitable desired plurality of parallel bladings 17, which allow for the creation of more than a single flow passages.

The course from the inlet region 11 to the separator plate 16 also becomes larger, the smaller the convexity of the divergent nozzle 13. This dictates making nozzle 13 with the largest possible inward convexity, as long as the aerodynamic function of divergent flow is not disturbed, the objective being to minimize re-evaporation phenomena as well as to confine the droplets enriched zone at the least possible space.

Because of the rise in pressure, a certain evaporation of droplets continues taking place within space 15. However, this evaporation stops after a certain point because this flow although comprising a fraction of the overall flow, still contains the whole of the droplets. Thus, it is expected that re-evaporation is confined merely to so many droplets as corresponding to saturation of this fraction of flow. By way of example, if the separator plate 16 divides the flow in a manner such that the flow in space 15 is ¼th of the overall flow, the approximate amount of droplets expected to re-evaporate is ¼th of the droplets available in the flow prior to the separator. The remaining droplets will be maintained in the liquid phase, since they are in a saturated environment.

The abovementioned reference to re-evaporation refers to those cases where droplets tend to re-evaporate, such as in the applications of drying or of the separation of natural gas. Applications of the present invention are however not confined in the above and the invention may also be applicable in any other cases where re-evaporation phenomena are not present.

The droplet enriched zone is connected via duct 3 to the classical type of subsonic separator 5, wherein the liquid obtained by the droplets is recovered and supplied to the tank 6, wherefrom it is pumped through pump 7 and supplied at a desired space or discharged. Following separator 5, the first zone being free from droplets is led via fan 8 to converge with the second zone in the common flow channel 9, wherefrom by means of compressor 10 it is led to the desired space, e.g. for disposal to the surroundings.

Employment of compressor 10 is necessary to cover for all kinds of losses.

It must be noted that in the case of sonic flow at throat 12, the droplets display a high inertia and therefore cannot follow the fall in the speed of the flow. Thus, the basic separation factor in this case too is the initial inertia of the droplets. It is also worth noting that the cross sectional area of throat 12 may vary by means of a mechanical or a hydraulic mechanism, so as to adjust for the shock wave to take place exactly at the throat, thereby resulting to the least possible rise in entropy and to the highest possible efficiency.

The supersonic separator of the present invention may function either independently as described herein above or supplemented by another separator. The principle of separation by means of a normal shock wave can be applied for a supplementary separation in Garett's patents or for a supplementary separator in a generally supersonic separator of the centrifugal type. In centrifugal separators supplementary separation is generally necessary, because the centrifugal forces are not usually adequate when droplets of a small diameter are involved.

Already, substantial advantages of the present supersonic separator against separators of the prior art have been summarized in the comparison Table 1.

Herein below, reference is made to illustrative sizes used in this invention:

1. Mach number before the shock is of the order of 1.2–2.
2. Cross sectional area of the throat 12 is of the order of 0.5–3 sq.cm.
3. The ratio of cross sectional areas obtained by the separator plate is of the order of 0.1–0.3.
4. Length of the supersonic separator is preferably of the order of 5–50 cm.

It must hereby be noted that description of the present invention was herein made by reference to illustrative but not confining examples. Thus any change or amendment relating to the shape, sizes, dimensions, materials and accessories used, as long as they do not comprise a new inventive step and do not contribute towards technical innovation in the state of the art, are considered to be part of the scope and aims of the present invention.

I claim:

1. A method for the separation of droplets from a gas stream in a gas-droplets mixture, wherein the mixture enters a separator mechanism at supersonic speed attained through a Laval nozzle, comprising the steps of:
   convergence of said gas-droplets mixture flow, resulting to an inertial differentiation of the speed of droplets from the speed of gas, the gas flow being decelerated;
   creation of a normal shock wave, resulting to an abrupt transition from supersonic to subsonic flow, whereof the droplets undergo a further inertial differentiation of their speed relative to the gas flow;

divergence of flow within a convex divergent nozzle downstream said normal shock wave and change in the flow direction, the inertia of droplets resulting to the creation of two subflows, one droplet enriched and one relatively droplet-free subflow;

separation and recovery of pressures of said subflows up to the values imposed by their subsonic discharge conditions, said separation being implemented by means of a separator plate dividing a purely divergent nozzle downstream said convex divergent nozzle into two partial divergent nozzles, one for said droplet-enriched subflow and one for said relatively droplet-free subflow;

discharge of said droplet-enriched subflow and of said relatively droplet-free subflow through separate outlet ducts, further subsonic separation of said droplet-enriched subflow to receive a liquid and a gas stream, disposal of said liquid and convergence of said gas stream in a common flow channel with said relatively droplet-free subflow and compression of said gas stream and said droplet-free subflow prior to their disposal.

2. The method of claim 1 for the separation of droplets from a gas stream in a gas-droplets mixture, wherein the droplets are subject to re-evaporation during separation, and wherein minimisation of re-evaporation phenomena in the course of separation is achieved with the method further comprising division of said gas-droplets mixture into a plurality of gas-droplets flows, each of said gas-droplets flows undergoing:

convergence, resulting to an inertial differentiation of the speed of droplets from the speed of gas, the gas flow being decelerated;

transition from supersonic to subsonic flow and further inertial differentiation of the speed of droplets relative to the gas flow due to creation of a normal shock wave;

divergence within a convex divergent nozzle downstream said normal shock wave and change in the flow direction, the inertia of droplets resulting to the creation of two subflows, one droplet enriched and one relatively droplet-free subflow;

separation and recovery of pressures of said subflows up to the values imposed by their subsonic discharge conditions, said separation being implemented by means of a separator plate, one said separator plate for each of said gas-droplets flows, each said separator plate dividing a purely divergent nozzle downstream said convex divergent nozzle into two partial divergent nozzles, one for said droplet-enriched subflow and one for said relatively droplet-free subflow.

3. A supersonic separator of droplets from a gas stream in a gas-droplets mixture, wherein the mixture attains a supersonic speed through a laval nozzle located upstream said supersonic separator, said supersonic separator being an inverse Laval nozzle, comprising:

a convergent nozzle within which the speed of droplets is inertially differentiated from the speed of the gas, the gas flow being decelerated;

a throat, in the vicinity of which a normal shock wave occurs, resulting to an abrupt transition from supersonic to subsonic speed of the gas flow, said droplets undergoing a further inertial differentiation of their speed relative to the gas flow;

a convex divergent nozzle downstream said throat within which said droplets are inertially deflected from the gas streamlines and two subflows are created, one droplet-enriched subflow and one relatively droplet-free subflow;

a divergent nozzle downstream said convex divergent nozzle, a separator plate within said divergent nozzle, said separator plate dividing said divergent nozzle into two partial divergent nozzles, one of said partial divergent nozzles receiving said droplet-enriched subflow and the other of said partial divergent nozzles receiving said relatively droplet-free subflow, pressures of said droplet-enriched and said relatively droplet-free subflows being recovered up to the values imposed by their subsonic discharge conditions within said two partial divergent nozzles;

an outlet duct for said droplet-enriched subflow, and an outlet duct for said relatively droplet-free subflow, a subsonic separator wherein a gas stream is separated from liquid being obtained from said droplet-enriched subflow, a tank wherein said liquid is supplied and a pump for pumping said liquid from said tank, a fan leading said gas stream from said subsonic separator to converge with said relatively droplet-free subflow in a common flow channel, a compressor receiving said gas stream and said relatively droplet-free subflow from said common flow channel, to cover for all kinds of losses prior to their disposal.

4. The supersonic separator of the above claim 3, wherein the droplets are subject to re-evaporation during separation, further comprising an arrangement of parallel bladings, each of said bladings creating upstream said throat a pair of convex divergent nozzles along which a droplet-enriched and a relatively droplet-free subflow is created and downstream said convex divergent nozzles a pair of divergent nozzles, one separator plate within each of said divergent nozzles, said separator plate dividing each of said divergent nozzles into two partial divergent nozzles, one of said partial divergent nozzles receiving said droplet-enriched subflow and the other of said partial divergent nozzles receiving said relatively droplet-free subflow.

5. The method of claim 1 for the separation of droplets from a gas stream in a gas-droplets mixture, further comprising the step of varying the cross sectional area at a throat region located between the area of convergence and the area of divergence of said gas-droplets mixture flow, so as to adjust for creation of said normal shock wave exactly at said throat region.

* * * * *